Patented Aug. 8, 1933

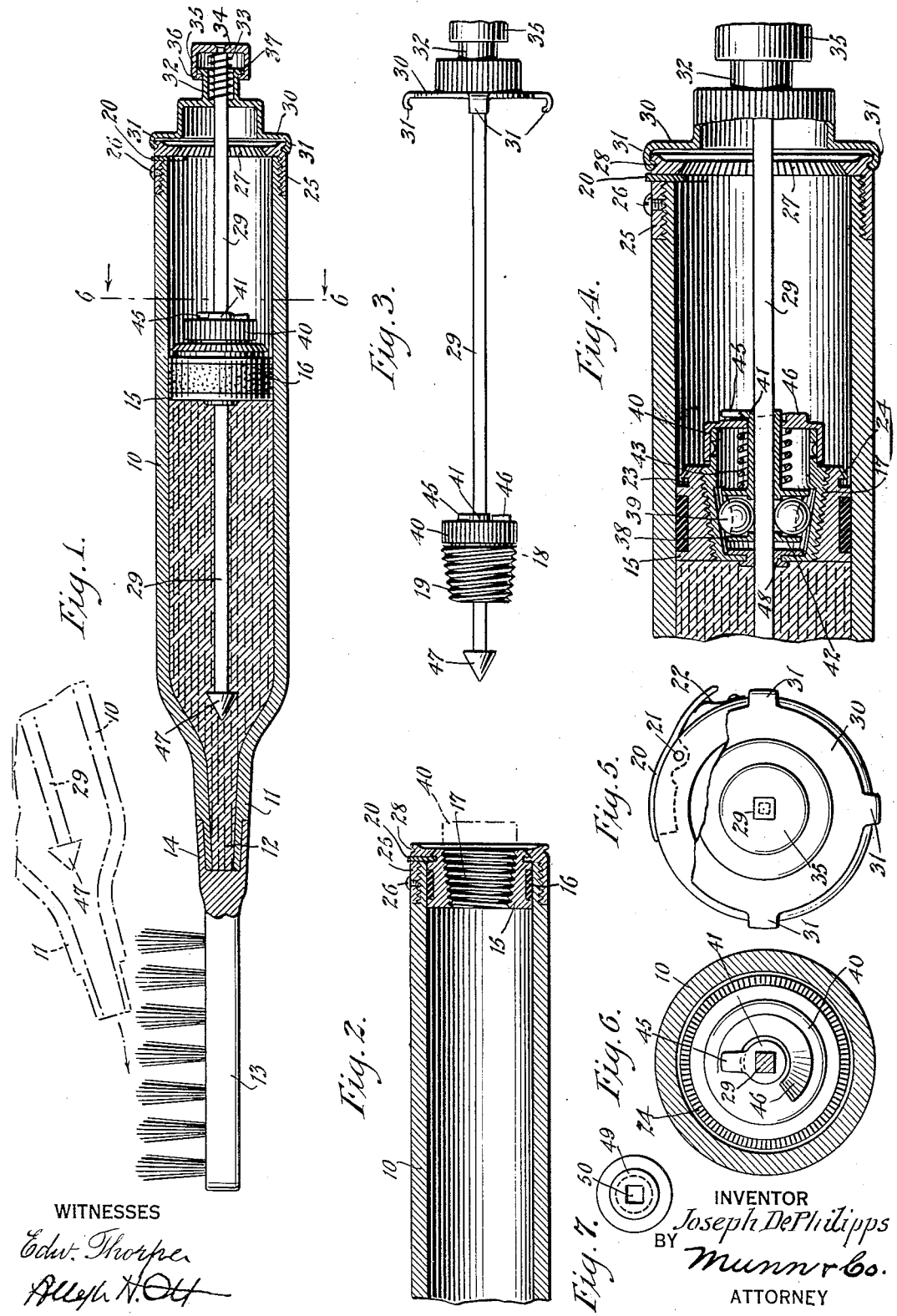

1,921,912

UNITED STATES PATENT OFFICE 1,921,912

RESERVOIR APPLICATOR

Joseph De Philipps, New York, N. Y.

Application March 7, 1932. Serial No. 597,386

5 Claims. (Cl. 221—78)

This invention relates to fountain or reservoir applicators, and comprehends an applicator in which the handle serves as a reservoir which has an outlet end with which the applicator head is removably associated to close the same and from which said head is removed for the purpose of applying the reservoir contents to the head.

The invention further resides in an improved means for feeding the contents of the reservoir through the outlet, which means more particularly embodies a plunger and a reciprocatory plunger rod operable upon successive reciprocations to advance the plunger.

As a further object, the invention contemplates a plunger for a reservoir of the indicated character which is formed with an opening therethrough normally closed by a closure plug which is removable through the rear end of the reservoir when the plunger is retracted to facilitate the filling of the reservoir through the plunger opening.

Other objects of the invention reside in the comparative simplicity of construction, the economy with which the device may be produced and the general efficiency derived therefrom.

With the above recited and other objects in view, reference is had to the following description and accompanying drawing, in which there is exhibited one example or embodiment of the invention, while the claims define the actual scope of the same.

In the drawing:

Figure 1 is a fragmentary and longitudinal sectional view through a reservoir applicator constructed in accordance with the invention, the reservoir handle being illustrated in broken lines as separated from the head and in juxtaposition thereto for feeding the contents thereon.

Figure 2 is a fragmentary longitudinal section of the handle illustrating the plunger retracted with the closure plug removed to facilitate filling of the reservoir.

Figure 3 is a side view of the closure plug and plunger rod assembly removed from the reservoir handle.

Figure 4 is an enlarged fragmentary longitudinal sectional view particularly illustrating the clutch mechanism and plunger rod reciprocating means.

Figure 5 is an enlarged rear end view of the device.

Figure 6 is an enlarged transverse sectional view taken approximately on the line 6—6 of Figure 1.

Figure 7 is a detail view of the swiveled bushing provided in the closure plug.

Referring to the drawing by characters of reference, 10 designates a tubular body or barrel which serves in the capacity of a reservoir and handle and which is provided at its forward end with a restricted neck 11 having an outlet 12 through which the contents are adapted to be expressed or fed. An applicator or brush head 13 is formed with a socketed rear end 14 adapted to fit over the neck 11 to couple the head with the reservoir handle 10 and to serve as a closure for the outlet 12.

In order to provide means for expressing or feeding the contents of the reservoir handle therefrom through the outlet 12, a plunger 15 is provided which is movable longitudinally within the reservoir 10 and which is provided with the usual packing 16. In order to facilitate the filling or charging of the reservoir 10, the plunger is formed with a tapered internally threadedly axially extending opening 17, the tapered thread permitting of the association therewith of the threaded outlets of various sizes of collapsible tubes. A combined closure plug and clutch casing 18 is provided with a correspondingly tapered threaded portion 19 which is normally received in the plunger opening 17 to close the same, and said plug is designed to be removed through the rear end of the reservoir handle when the plunger is retracted to the position illustrated in Figure 2. In order to hold the plunger in its retracted position when the plug is removed and during the filling of the reservoir, a detent 20 fulcrumed at 21 is normally urged by a spring 22 radially inward into engagement within the peripheral groove 23 of the plunger, said detent being capable of manual retraction against the action of the spring 22. In view of the fact that the plunger and bore of the reservoir handle 10 are preferably round, it is essential to provide some means for locking the parts against relative rotation when threading the outlet nozzle of a collapsible tube into the threaded plunger opening 17 and to this end, the rear end 24 of the plunger is of frusto-conical configuration and formed with radial teeth 23. A cap 25 is threadedly engaged over the rear end of the reservoir handle and is secured in place by a set screw 26, and said cap is formed with a frusto-conical toothed opening 27 of lesser diameter than the internal diameter of the reservoir but of greater diameter than the plug 18, to permit the plug to freely pass therethrough. The opening is of a size to receive and interengage with the rear end 24 of the plunger to lock the same against relative rotation in the barrel when it is retracted to the position illustrated in Figure 2. The cap 25 also serves as a means for preventing the complete withdrawal of the plunger 15 except when assembling or disassembling the device.

In order to provide means for moving the plunger 15, a plunger rod 29 is provided which is of non-circular formation and preferably square in cross section, and said plunger rod extends through and has bearing in a guide 30 which is removably carried by the rear end of the reservoir handle, preferably by the engagement of the spring fingers 31 in the groove 28 formed in the cap 25. The guide 30 is formed with a rearwardly projecting boss 32 which houses a coiled expansion spring 33 bearing at its forward end against the body of the guide and exerting a pressure at its rear end upon a manipulating button 34 attached to the rear end of the plunger rod. The button is formed with a forwardly projecting annular flange 35 having an inturned annular bead 36 at its forward end which is designed to engage with an outturned annular bead 37 at the rear end of the boss to limit the retractive movement of the plunger rod under the action of the spring 33. The plunger rod 29 extends forwardly and axially through the reservoir handle and plug or clutch casing 18. The plug or clutch casing is formed internally with a tapered or frusto-conical wall 38, between which and the faces of the plunger rod 29 a plurality of clutch elements 39, preferably in the nature of steel balls, are provided. The rear end of the plug or clutch casing is closed by a removable cap 40 through which a tubular sleeve 41 extends, the sleeve being provided at its forward end with a head 42 having radial openings accommodating the clutch elements or balls 39. The sleeve and head are normally urged forwardly by a coiled expansion spring 43 interposed between the cap 40 and the head 42. Under this construction and arrangement, it is obvious that when the plunger rod 29 is pressed forwardly by the manipulating button 34 against the action of the spring 33, the clutch elements or balls 39 bind between the tapered or frusto-conical wall 38 and the faces of the plunger rod to cause the plunger 15 to be moved forwardly with the plunger rod. When the pressure on the manipulating button is released and the spring 33 retracts the plunger rod, it is apparent that the clutch elements or balls 39 will release, permitting the plunger to remain in position while the plunger rod moves relatively thereto in a rearward direction until its next forward movement. In order to render the clutch ineffective when it is desired to reset the plunger adjacent the rear end of the plunger rod, the sleeve 41 is formed with a radially projecting cam finger 45 at its rear end which is designed to engage with a semi-circular cam 46 formed on the rear of the cap 40, it being apparent that when the sleeve is turned with reference to the plug and cap, the finger will ride up onto the high point of the cam and retract the sleeve and sleeve head 42 to prevent binding of the cam elements or balls 39. The plunger and plug 18 may then be freely moved rearwardly on the plunger rod 29. In order to limit the forward movement of the plunger on the plunger rod, a stop head 47 is provided which also acts as an agitator at the juncture of the restricted forward end 11 with the remainder of the reservoir handle. In order to facilitate the turning of the plunger rod 29 in the plug 18 at the forward end, a swiveled bearing element 48 is provided which is formed with a circular groove 49 and an opening 50 which corresponds with the cross sectional shape of the plunger.

In filling the reservoir handle 10, the spring fingers 31 of the guide 30 are released from the groove 28 of the cap 25 by exerting an outward pull thereon. The head 47 engaging with the forward end of the plunger plug bushing 48 serves as a means for drawing the plunger 15 to the rear end of the handle where it abuts with the cap 25. This disposes the plug cap 40 exteriorly of the rear end of the reservoir handle, as shown in broken lines in Figure 2, and at the same time engages the toothed end 24 of the plunger within the toothed opening 27 of the cap 25. By grasping the plug cap 40 which is exteriorly milled, it is apparent that the plug may be unscrewed and disconnected and removed from the plunger together with the plunger rod 29. The operator having previously engaged the detent 20 with the plunger groove 23, the threaded neck of a collapsible tube may be coupled therewith and the contents extruded into the reservoir handle through the plug opening 17. After this is accomplished, the plug 18 is retracted to the rear end of the plunger rod 29 and the plunger rod inserted and the plug screwed home in the plunger. The detent 20 is then released and the spring fingers 31 of the guide 30 reengaged with the groove 28 and the device is again ready for operation. When the contents of the reservoir handle is to be dispensed and fed onto the applicator head 13, the applicator head is removed and the operator by successive forward pressures on the manipulating button will feed the plunger forwardly to express the contents through the outlet 12.

In the present instance, the device is particularly illustrated as a fountain toothbrush in which the reservoir handle contains a dentifrice, but it is to be understood that the device is not necessarily limited to this use or to the structural details illustrated, as variations and modifications which fall within the scope of the appended claims may be resorted to when desired.

What is claimed is:

1. In a device of the character described, a tubular reservoir body having an outlet at its forward end, a plunger for expressing the contents through the outlet, said plunger having an axial opening and a plug normally closing the same and removable therefrom to permit filling of the body through said opening when the plunger is retracted to the rear end of the body and reciprocating means extending through the plug for feeding the plunger forwardly of the body.

2. In a device of the character described, a tubular reservoir body having an outlet at its forward end, a plunger for expressing the contents through the outlet, said plunger having an axial opening and a plug normally closing the same and removable therefrom to permit filling of the body through said opening when the plunger is retracted to the rear end of the body and means for feeding the plunger forwardly of the body including a clutch housed by the plug and a reciprocatory plunger extending through the plug for cooperation with the clutch upon forward movement to move the plunger forwardly of the body and to release upon rearward movement.

3. In a device of the character described, a tubular reservoir body having an outlet at its forward end, a plunger for expressing the contents through the outlet, said plunger having an axial opening and a plug normally closing the same and removable therefrom to permit filling of the body through said opening when the plunger is retracted to the rear end of the body, means for feeding the plunger forwardly of the body including a clutch housed by the plug and a reciprocatory plunger extending through the plug for cooperation with the clutch upon forward movement to move the plunger forwardly of the body and to release upon rearward movement and means detachably carried by the rear end of the body for guiding and normally retracting the plunger and for tensioning the same against forward movement.

4. In a device of the character described, a tubular reservoir body having an outlet at its forward end, a plunger for expressing the contents through the outlet, said plunger having an axial opening and a plug normally closing the same and removable therefrom to permit filling of the body through said opening when the plunger is retracted to the rear end of the body, means for feeding the plunger forwardly of the body including a clutch housed by the plug and a reciprocatory plunger extending through the plug for cooperation with the clutch upon forward movement to move the plunger forwardly of the body and to release upon rearward movement and interengaging means on the plunger and the rear end of the body for locking the plunger against relative turning movement in the body.

5. In a device of the character described, a tubular reservoir body having an outlet at its forward end, a plunger for expressing the contents through the outlet, said plunger having an axial opening and a plug normally closing the same and removable therefrom to permit filling of the body through said opening when the plunger is retracted to the rear of the body, means for feeding the plunger forwardly of the body including a clutch housed by the plug and a reciprocatory plunger extending through the plug for cooperation with the clutch upon forward movement to move the plunger forwardly of the body and to release upon rearward movement, interengaging means on the plunger and the rear end of the body for locking the plunger against relative turning movement in the body and manually releasable detent means at the rear end of the barrel for holding the plunger against forward movement.

JOSEPH DE PHILIPPS.